United States Patent
Sheshadri et al.

(10) Patent No.: US 12,454,367 B2
(45) Date of Patent: Oct. 28, 2025

(54) METHODS AND SYSTEMS TO EVALUATE THE POSITION OF AIRCRAFT LANDING GEAR

(71) Applicant: HONEYWELL INTERNATIONAL INC., Charlotte, NC (US)

(72) Inventors: Rohith Sheshadri, Bangalore (IN); Sunitha Panchangam, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 91 days.

(21) Appl. No.: 18/436,145

(22) Filed: Feb. 8, 2024

(65) Prior Publication Data

US 2025/0153858 A1 May 15, 2025

(30) Foreign Application Priority Data

Dec. 11, 2023 (IN) .............................. 202311084330

(51) Int. Cl.
*B64D 45/00* (2006.01)

(52) U.S. Cl.
CPC .. *B64D 45/0005* (2013.01); *B64D 2045/0085* (2013.01)

(58) Field of Classification Search
CPC ........ B64D 45/0005; B64D 2045/0085; B64D 43/00; B64D 45/00
See application file for complete search history.

(56) References Cited

U.S. PATENT DOCUMENTS

| | | | |
|---|---|---|---|
| 5,745,053 A * | 4/1998 | Fleming, III ........... | B64C 25/28 340/963 |
| 9,310,222 B1 | 4/2016 | Suiter et al. | |
| 9,751,636 B2 * | 9/2017 | Dangler ............. | B64D 45/0005 |
| 10,696,418 B2 | 6/2020 | Pena et al. | |
| 10,913,549 B1 | 2/2021 | Buchmueller et al. | |
| 11,657,721 B1 * | 5/2023 | Suiter ...................... | G08G 5/34 701/14 |
| 2003/0065428 A1 * | 4/2003 | Mendelson .......... | G05D 1/0055 701/9 |
| 2013/0197739 A1 * | 8/2013 | Gallagher ................. | B64F 5/60 701/31.5 |
| 2015/0268090 A1 | 9/2015 | Munger et al. | |
| 2018/0086439 A1 * | 3/2018 | Thompson ............. | B64D 45/00 |
| 2018/0170529 A1 | 6/2018 | Schmidt | |

(Continued)

*Primary Examiner* — Donald J Wallace
*Assistant Examiner* — Jalal C Coduroglu
(74) *Attorney, Agent, or Firm* — Ingrassia Fisher & Lorenz, LLP

(57) ABSTRACT

A method and system for evaluating the position of landing gear on an aircraft has been developed. A change is detected in audio noise of the aircraft from an enhanced flight audio recording system (EFARS) and compared with a database of audio outputs of the aircraft with the landing gear extended. An increase in vibrations of the aircraft is detected with a flight management system (FMS) and compared to a database of vibrations of the aircraft with the landing gear extended. A decrease in airspeed of the aircraft is detected with the FMS and compared with a database of airspeed of the aircraft with the landing gear extended. The position of the landing gear is determined based on results of comparisons of the change in audio noise, the increase in vibrations and the decrease in airspeed. The position of the landing gear to is then indicated to the pilot.

20 Claims, 4 Drawing Sheets

(56) References Cited

U.S. PATENT DOCUMENTS

| | | | |
|---|---|---|---|
| 2020/0216190 A1* | 7/2020 | Schwindt | B64D 43/02 |
| 2020/0216193 A1 | 7/2020 | Muehlbauer et al. | |
| 2022/0340268 A1* | 10/2022 | Cote | B64D 45/0005 |
| 2022/0388633 A1* | 12/2022 | Page | B64C 25/04 |
| 2023/0114485 A1 | 4/2023 | Tucker et al. | |

* cited by examiner

METHODS AND SYSTEMS TO EVALUATE THE POSITION OF AIRCRAFT LANDING GEAR

CROSS REFERENCE TO RELATED APPLICATION

This application claims priority to India Provisional Patent Application No. 202311084330, filed Nov. 12, 2023, the entire content of which is incorporated by reference herein.

TECHNICAL FIELD

The present invention generally relates to aircraft avionics, and more particularly relates to methods and systems to evaluate the position of aircraft landing gear.

BACKGROUND

In the event a pilot fails to extend the landing gear of an aircraft as it approaches to make a landing, the pilot will trigger warnings in the cockpit about the landing gear being retracted. However, there have been instances where the sensors responsible for detection of the landing gear position malfunctioned or were deactivated resulting in no waring in the cockpit when the pilot attempted to land the aircraft with the landing gear retracted. Hence, there is a need for methods and systems to evaluate the position of aircraft landing gear.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for evaluating the position of landing gear on an aircraft. The method comprises: detecting a change in audio noise of the aircraft from an enhanced flight audio recording system (EFARS) located onboard the aircraft; comparing the change in audio noise of the aircraft to a database of audio outputs of the audio pitch of the aircraft with the landing gear extended; detecting an increase in vibrations of the aircraft from a flight management system (FMS) located onboard the aircraft; comparing the increase in vibrations of the aircraft to a database of vibrations of the aircraft with the landing gear extended; detecting a decrease in airspeed of the aircraft from the FMS; comparing the decrease in airspeed of the aircraft to a database of airspeed of the aircraft with the landing gear extended; determining the position of the landing gear based on results of the comparisons of the change in audio noise, the increase in vibrations and the decrease in airspeed; and indicating the position of the landing gear to a pilot of the aircraft.

A system is provided for evaluating the position of landing gear on an aircraft. The system comprises: an enhanced flight audio recording system (EFARS) located onboard the aircraft, where the EFARS detects a change in audio noise of the aircraft; a flight management system (FMS) located onboard the aircraft, where the FMS detects an increase in vibrations of the aircraft; a learning module the is part of a processing system of a multifunction control and display unit (MCDU) located onboard the aircraft, where the learning module, compares the change in audio noise of the aircraft to a database of audio outputs of the audio pitch of the aircraft with the landing gear extended, detects an increase in vibrations of the aircraft from the FMS, compares the increase in vibrations of the aircraft to a database of vibrations of the aircraft with the landing gear extended, detects a decrease in airspeed of the aircraft from the FMS, compares the decrease in airspeed of the aircraft to a database of airspeed of the aircraft with the landing gear extended, and determines the position of the landing gear based on results of the comparisons of the change in audio noise, the increase in vibrations and the decrease in airspeed; and a display device located that indicates the position of the landing gear to a pilot of the aircraft.

Furthermore, other desirable features and characteristics of the disclosed embodiments will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A method and system for evaluating the position of landing gear on an aircraft has been developed. A change is detected in audio noise of the aircraft from an enhanced flight audio recording system (EFARS) and compared with a database of audio outputs of the aircraft with the landing gear extended. An increase in vibrations of the aircraft is detected with a flight management system (FMS) and compared to a database of vibrations of the aircraft with the landing gear extended. A decrease in airspeed of the aircraft is detected with the FMS and compared with a database of airspeed of the aircraft with the landing gear extended. The position of the landing gear is determined based on results of comparisons of the change in audio noise, the increase in vibrations and the decrease in airspeed. The position of the landing gear to is then indicated to the pilot.

Before proceeding further, it is noted that, for convenience, the following description is in the context of an aircraft environment. It will be appreciated, however, that the claimed invention is not limited to any particular aircraft environment, but may be implemented in numerous other vehicular and non-vehicular environments.

Figure 1:
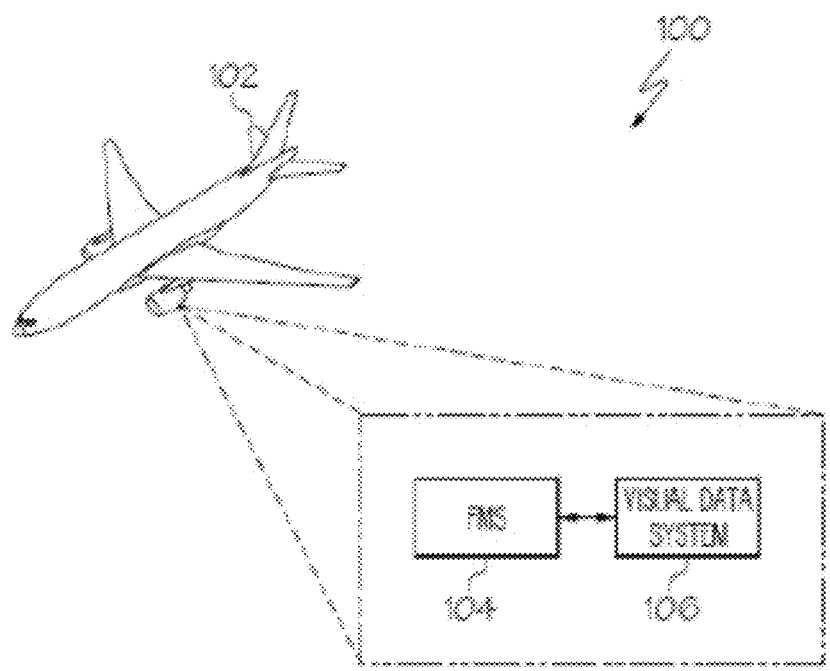
FIG. 1 shows a diagram of an in-flight aircraft that contains an onboard flight management system (FMS) along with a visual data system in accordance with some embodiments.

Turning now to FIG. 1, a diagram 100 is shown of an in-flight aircraft 102 that contains an onboard flight management system (FMS) 104 along with a visual data system 106 that is accessed by the FMS 104 in accordance with one embodiment. In alternative embodiments, the visual data system 106 may be integrated as part of the FMS 104. The FMS 104, as is generally known, is a specialized computer that automates a variety of in-flight tasks such as in-flight management of the flight plan. Using various sensors such as global positioning system (GPS), the FMS 104 determines the aircraft's position and guides the aircraft along its flight plan using its navigation database. From the cockpit, the FMS 104 is normally controlled through a visual display device such as a control display unit (CDU) which incorporates a small screen, a keyboard or a touchscreen. The FMS 104 displays the flight plan and other critical flight data to the aircrew during operation.

The FMS 104 may have a built-in electronic memory system that contains a navigation database. The navigation database contains elements used for constructing a flight plan. In some embodiments, the navigation database may be separate from the FMS 104 and located onboard the aircraft while in other embodiments the navigation database may be located on the ground and relevant data provided to the FMS 104 via a (non-illustrated) communications link with a (non-illustrated) ground station. The navigation database used by the FMS 104 may typically include: waypoints/ intersections; airways; radio navigation aids/navigation beacons; airports; runway; standard instrument departure (SID) information; standard terminal arrival (STAR) information; holding patterns; and instrument approach procedures. Additionally, other waypoints may also be manually defined by pilots along the route.

The flight plan is generally determined on the ground before departure by either the pilot or a dispatcher for the owner of the aircraft. It may be manually entered into the FMS 104 or selected from a library of common routes. In other embodiments the flight plan may be loaded via a communications data link from an airline dispatch center. During preflight planning, additional relevant aircraft performance data may be entered including information such as: gross aircraft weight; fuel weight and the center of gravity of the aircraft. The aircrew may use the FMS 104 to modify the plight flight plan before takeoff or even while in flight for a variety of reasons. Such changes may be entered via the CDU. Once in flight, the principal task of the FMS 104 is to accurately monitor the aircraft's position. This may use a GPS, a VHF omnidirectional range (VOR) system, or other similar sensor in order to determine and validate the aircraft's exact position. The FMS 104 constantly cross checks among various sensors to determine the aircraft's position with accuracy.

Additionally, the FMS 104 may be used to perform advanced vertical navigation (VNAV) functions. The purpose of VNAV is to predict and optimize the vertical path of the aircraft. The FMS 104 provides guidance that includes control of the pitch axis and of the throttle of the aircraft. In order to accomplish these tasks, the FMS 104 has detailed flight and engine model data of the aircraft. Using this information, the FMS 104 may build a predicted vertical descent path for the aircraft. A correct and accurate implementation of VNAV has significant advantages in fuel savings and on-time efficiency.

In exemplary embodiments, an existing flight management computer (FMC) (or flight management system (FMS)) onboard an aircraft is utilized to communicate data between existing onboard avionics systems or line-replaceable units (LRUs) and another module coupled to the FMC, which supports or otherwise performs new flight management functionality that is not performed by the FMC. For example, a multifunction control and display unit (MCDU) may support or otherwise perform new flight management functionality based on data from onboard avionics or LRUs received via the FMC. In this regard, the FMC is configured to receive operational or status data from one or more avionics systems or LRUs onboard the aircraft at corresponding avionics interfaces and convert one or more characteristics of the operational data to support communicating the operational data with the MCDU. For purposes of explanation, the subject matter may primarily be described herein in the context of converting operational data received from onboard avionics or LRUs in a first format (e.g., an avionics bus format) into another format supported by the interface with the MCDU, the subject matter described herein is not necessarily limited to format conversions or digital reformatting, and may be implemented in an equivalent manner for converting between other data characteristics, such as, for example, different data rates, throughputs or bandwidths, different sampling rates, different resolutions, different data compression ratios, and the like.

Figure 2:
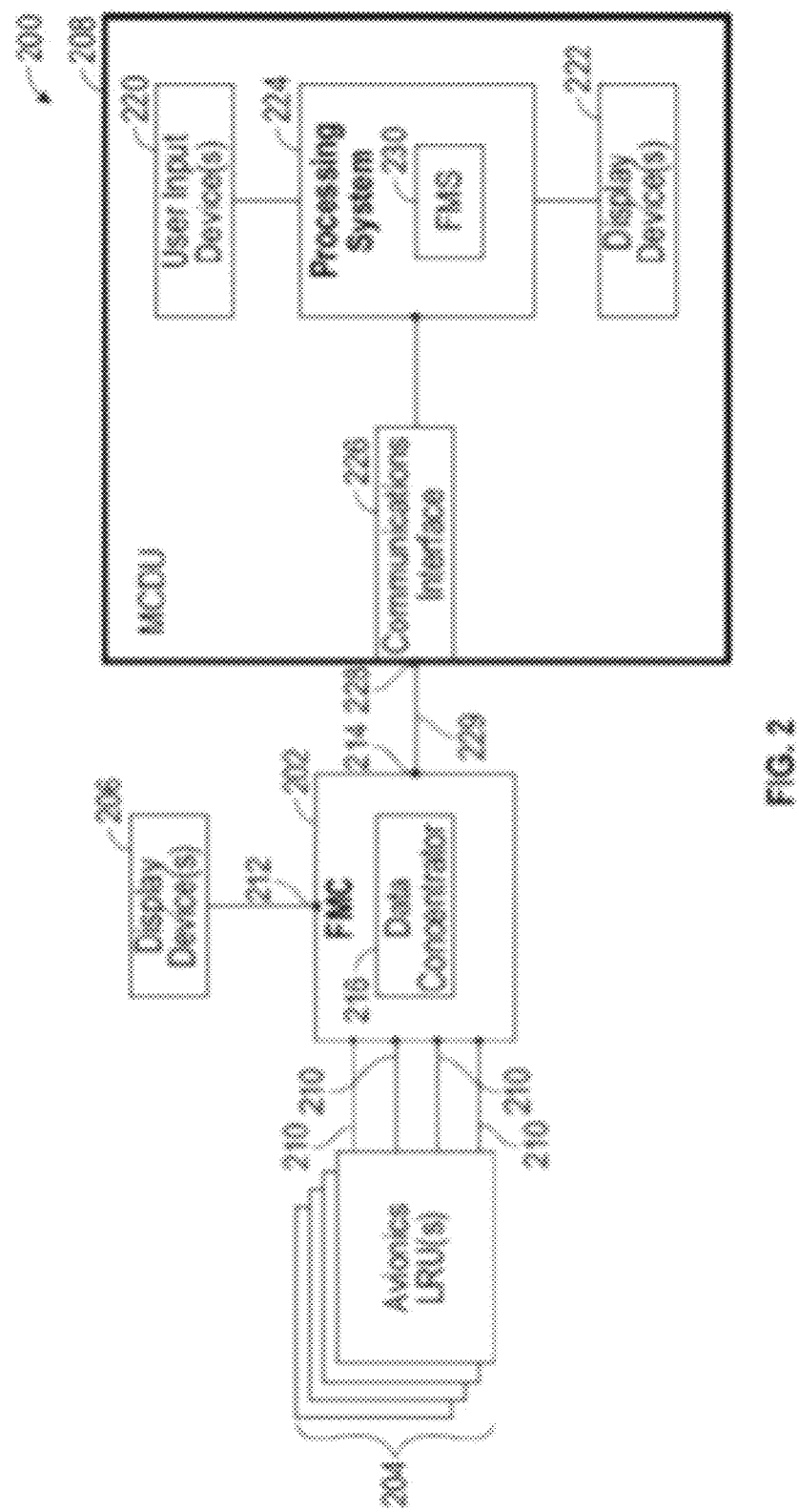
FIG. 2 shows a diagram of an aircraft system with a flight management computing (FMC) module communicatively coupled to a plurality of onboard avionics LRUs, one or more display devices and a multifunction computing module (MCU) in accordance with some embodiments.

FIG. 2 depicts an exemplary embodiment of an aircraft system 200 suitable for implementation onboard an aircraft 102 shown previously in FIG. 1. The illustrated aircraft system 200 includes a flight management computing module 202 communicatively coupled to a plurality of onboard avionics LRUs 204, one or more display devices 206, and a multifunction computing module 208. It should be appreciated that FIG. 2 depicts a simplified representation of the aircraft system 200 for purposes of explanation, and FIG. 2 is not intended to limit the subject matter in any way.

The flight management computing module 202 generally represents the FMC, the FMS, or other hardware, circuitry, logic, firmware and/or other components installed onboard the aircraft and configured to perform various tasks, functions and/or operations pertaining to flight management, flight planning, flight guidance, flight envelope protection, four-dimensional trajectory generation or required time of arrival (RTA) management, and the like. Accordingly, for purposes of explanation, but without limiting the functionality performed by or supported at the flight management computing module 202, the flight management computing module 202 may alternatively be referred to herein as the FMC. The FMC 202 includes a plurality of interfaces 210 configured to support communications with the avionics LRUs 204 along with one or more display interfaces 212 configured to support coupling one or more display devices 206 to the FMC 202. In the illustrated embodiment, the FMC 202 also includes a communications interface 214 that supports coupling the multifunction computing module 208 to the FMC 202.

The FMC 202 generally includes a processing system designed to perform flight management functions, and potentially other functions pertaining to flight planning, flight guidance, flight envelope protection, and the like. Depending on the embodiment, the processing system could be realized as or otherwise include one or more processors, controllers, application specific integrated circuits, programmable logic devices, discrete gate or transistor logics, discrete hardware components, or any combination thereof. The processing system of the FMC 202 generally includes or otherwise accesses a data storage element (or memory), which may be realized as any sort of non-transitory short or long term storage media capable of storing programming instructions for execution by the processing system of the FMC 202. In exemplary embodiments, the data storage element stores or otherwise maintains code or other computer-executable programming instructions that, when read and executed by the processing system of the FMC 202, cause the FMC 202 to implement, generate, or otherwise support a data concentrator application 216 that performs certain tasks, operations, functions, and processes described herein.

The avionics LRUs 204 generally represent the electronic components or modules installed onboard the aircraft that support navigation, flight planning, and other aircraft control functions in a conventional manner and/or provide real-time data and/or information regarding the operational status of the aircraft to the FMC 202. For example, practical embodiments of the aircraft system 200 will likely include one or more of the following avionics LRUs 204 suitably configured to support operation of the aircraft: a weather system, an air traffic management system, a radar system, a traffic avoidance system, an autopilot system, an autothrottle (or autothrust) system, a flight control system, hydraulics systems, pneumatics systems, environmental systems, electrical systems, engine systems, trim systems, lighting systems, crew alerting systems, electronic checklist systems, and/or another suitable avionics system.

In exemplary embodiments, the avionics interfaces 210 are realized as different ports, terminals, channels, connectors, or the like associated with the FMC 202 that are connected to different avionics LRUs 204 via different wiring, cabling, buses, or the like. In this regard, the interfaces 210 may be configured to support different communications protocols or different data formats corresponding to the respective type of avionics LRU 204 that is connected to a particular interface 210. For example, the FMC 202 may communicate navigation data from a navigation system via a navigation interface 210 coupled to a data bus supporting the ARINC 424 (or A424) standard, the ARINC 629 (or A629) standard, the ARINC 422 (or A422) standard, or the like. As another example, a datalink system or other communications LRU 204 may utilize an ARINC 619 (or A619) compatible avionics bus interface for communicating datalink communications or other communications data with the FMC 202.

The display device(s) 206 generally represent the electronic displays installed onboard the aircraft in the cockpit, and depending on the embodiment, could be realized as one or more monitors, screens, liquid crystal displays (LCDs), a light emitting diode (LED) displays, or any other suitable electronic display(s) capable of graphically displaying data and/or information provided by the FMC 202 via the display interface(s) 212. Similar to the avionics interfaces 210, the display interfaces 212 are realized as different ports, terminals, channels, connectors, or the like associated with the FMC 202 that are connected to different cockpit displays 206 via corresponding wiring, cabling, buses, or the like. In one or more embodiments, the display interfaces 212 are configured to support communications in accordance with the ARINC 661 (or A661) standard. In one embodiment, the FMC 202 communicates with a lateral map display device 206 using the ARINC 702 (or A702) standard.

In exemplary embodiments, the multifunction computing module 208 is realized as a multifunction control and display unit (MCDU) that includes one or more user interfaces, such as one or more input devices 220 and/or one or more display devices 222 (shown previously as 106 in FIG. 1), a processing system 224, and a communications module 226. The MCDU 208 generally includes at least one user input device 220 that is coupled to the processing system 224 and capable of receiving inputs from a user, such as, for example, a keyboard, a key pad, a mouse, a joystick, a directional pad, a touchscreen, a touch panel, a motion sensor, or any other suitable user input device or combinations thereof. The display device(s) 222 may be realized as any sort of monitor, screen, LCD, LED display, or other suitable electronic display capable of graphically displaying data and/or information under control of the processing system 224.

The processing system 224 generally represents the hardware, circuitry, logic, firmware and/or other components of the MCDU 208 configured to perform the various tasks, operations, functions and/or operations described herein. Depending on the embodiment, the processing system 224 may be implemented or realized with a general purpose processor, a microprocessor, a controller, a microcontroller, a state machine, an application specific integrated circuit, a field programmable gate array, any suitable programmable logic device, discrete gate or transistor logic, discrete hardware components, or any combination thereof, designed to perform the functions described herein. Furthermore, the steps of a method or algorithm described in connection with the embodiments disclosed herein may be embodied directly in hardware, in firmware, in a software module executed by the processing system 224, or in any practical combination thereof. In this regard, the processing system 224 includes or accesses a data storage element (or memory), which may be realized using any sort of non-transitory short or long term storage media, and which is capable of storing code or other programming instructions for execution by the processing system 224. In exemplary embodiments described herein, the code or other computer-executable programming instructions, when read and executed by the processing system 224, cause the processing system 224 to implement with an FMS 230 (shown previously as 104 in FIG. 1) additional tasks, operations, functions, and processes described herein.

The communications module 226 generally represents the hardware, module, circuitry, software, firmware and/or combination thereof that is coupled between the processing system 224 and a communications interface 228 of the MCDU 208 and configured to support communications between the MCDU 208 and the FMC 202 via an electrical connection 229 between the MCDU communications interface 228 and the FMC communications interface 214. For example, in one embodiment, the communications module 226 is realized as an Ethernet card or adapter configured to support communications between the FMC 202 and the MCDU 208 via an Ethernet cable 229 provided between Ethernet ports 214, 228. In other embodiments, the communications module 226 is configured to support communications between the FMC 202 and the MCDU 208 in accordance with the ARINC 429 (A429) standard via an A429 data bus 229 provided between A429 ports 214, 228 of the respective modules 202, 208. In yet other embodiments, the communications module 226 is configured to support communications between the FMC 202 and the MCDU 208 in accordance with the ARINC 422 (A422) standard via an A422 data bus 229 provided between A422 ports 214, 228 of the respective modules 202, 208. In yet other embodiments, the communications module 226 is configured to support communications between the FMC 202 and the MCDU 208 in accordance with the ARINC 739 (A739) standard via an A739 data bus 229 provided between A739 ports 214, 228 of the respective modules 202, 208.

In various embodiments, the FMC 202 and MCDU 208 communicate using a different communications protocol or standard than one or more of the avionics LRUs 204 and/or the display devices 206. In such embodiments, to support communications of data between the MCDU 208 and those LRUs 204 and/or display devices 206, the data concentrator application 216 at the FMC 202 converts data from one format to another before retransmitting or relaying that data to its destination. For example, the data concentrator application 216 may convert data received from an avionics LRU 204 to the A429 or Ethernet format before providing the data to the MCDU 208, and vice versa. Additionally, in exemplary embodiments, the FMC 202 validates the data received from an avionics LRU 204 before transmitting the data to the MCDU 208. For example, the FMC 202 may perform debouncing, filtering, and range checking, and/or the like prior to converting and retransmitting data from an avionics LRU 204.

It should be noted that although the subject matter may be described herein in the context of the multifunction computing module 208 being realized as an MCDU, in alternative embodiments, the multifunction computing module 208 could be realized as an electronic flight bag (EFB) or other mobile or portable electronic device. In such embodiments, an EFB capable of supporting an FMS 230 application may be connected to an onboard FMC 202 using an Ethernet cable 229 to support flight management functionality from the EFB in an equivalent manner as described herein in the context of the MCDU.

In one or more embodiments, the MCDU 208 stores or otherwise maintains programming instructions, code, or other data for programming the FMC 202 and transmits or otherwise provides the programming instructions to the FMC 202 to update or otherwise modify the FMC 202 to implement the data concentrator application 216. For example, in some embodiments, upon establishment of the connection 229 between modules 202, 208, the MCDU 208 may automatically interact with the FMC 202 and transmit or otherwise provide the programming instructions to the FMC 202, which, in turn, executes the instructions to implement the data concentrator application 216. In some embodiments, the data concentrator application 216 may be implemented in lieu of flight management functionality by the MCDU 208 reprogramming the FMC 202. In other embodiments, the FMC 202 may support the data concentrator application 216 in parallel with flight management functions. In this regard, the FMC 202 may perform flight management functions, while the FMS 230 application on the MCDU 208 supplements the flight management functions to provide upgraded flight management functionality within the aircraft system 200.

On any retractable gear aircraft, lowering the landing gear is part of the pilot's landing checklist for landing. However, some of these checklist items are neglected or performed by memory which increases the chances of forgetting to lower the landing gear. Even careful pilots are at risk, because they may be distracted or be interrupted by other duties. Hence there is a need to build extra safety systems in the aircraft to reduce the possibility of human error.

Present embodiments of the disclosed method and system gather situational awareness enabled by several existing sensors, FMS data and other artificial intelligence based systems to understand the pilot's intention to land, detect when the landing gear is retracted and make necessary warnings to enable the pilot to take corrective steps. The proposed system provides controlling and alerting systems that senses, alerts and potentially automatically corrects the improper landing gear status prior to initiating the landing.

The system makes use of an artificial/machine learning (AI/ML) module. Machine learning (ML) is a branch of artificial intelligence (AI) and computer science which focuses on the use of data and algorithms to imitate the way that humans learn, gradually improving its accuracy. Machine learning uses a technique known as supervised learning, which trains a model on known input and output data so that it can predict future outputs. Supervised machine learning builds a model that makes predictions based on evidence in the presence of uncertainty. A supervised learning algorithm takes a known set of input data and known responses to the data (output) and trains a model to generate reasonable predictions for the response to new data.

Figure 3:
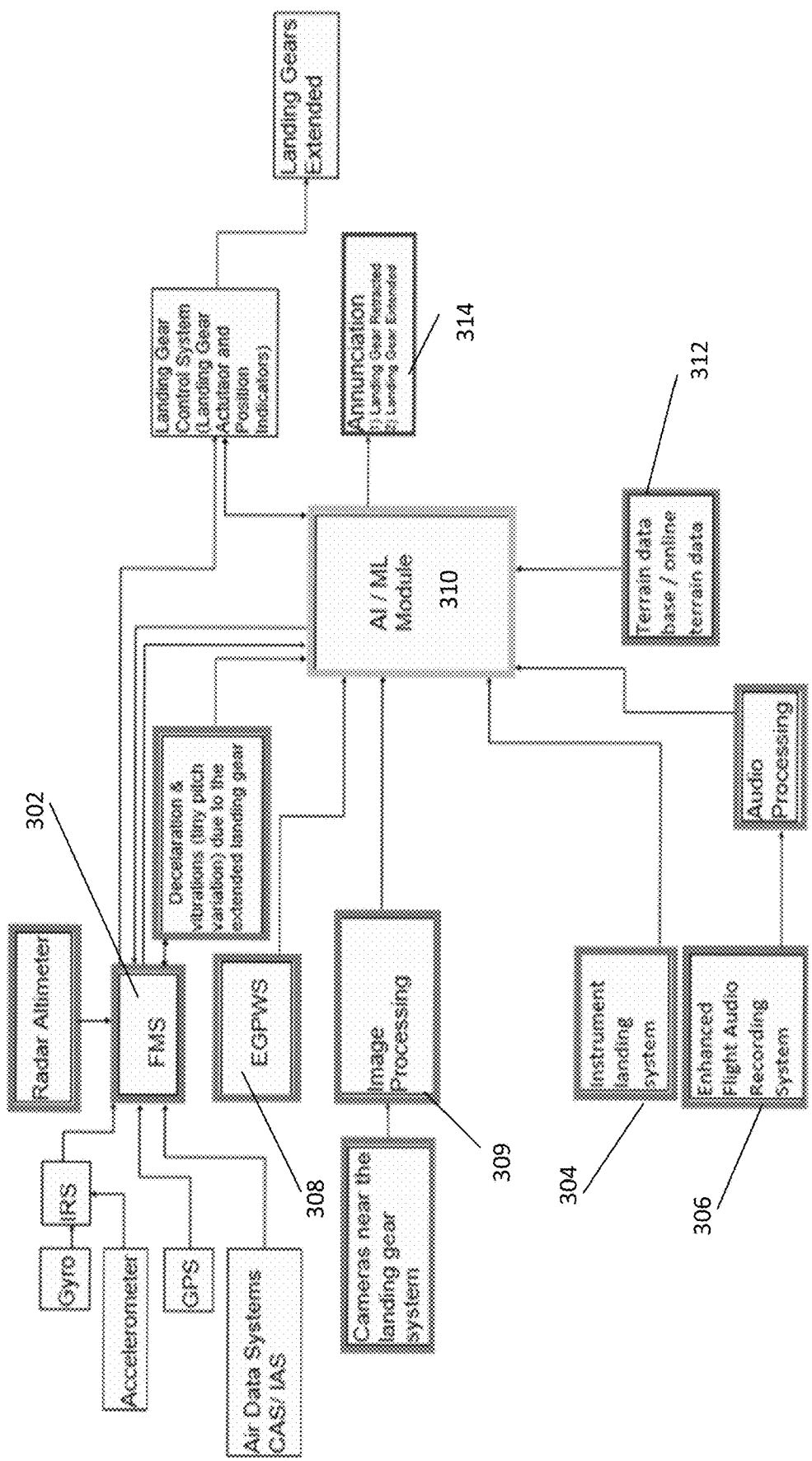
FIG. 3 shows a block diagram of a system for evaluating the position of landing gear on an aircraft in accordance with some embodiments.

Turning now to FIG. 3, a block diagram 300 is shown of a system for evaluating the position of landing gear on an aircraft in accordance with some embodiments. In this embodiment, the AI/ML 310 module receives the exact location of the aircraft by data from the FMS 302. The FMS 302 determines the exact aircraft location from various sources including an inertial reference system (IRS) and a global positioning system (GPS). The aircraft's altitude and rate of ascent or descent. The Aircraft's altitude may also be determined using the enhanced ground proximity warning system (EGPWS) 308. The current status of the landing gear (extended, retracted, etc.) is obtained from onboard cameras that provided data to an image processing system 309. Additionally, conventional landing gear position indicators will still be used to provide landing gear position information to the AI/ML module 310. The AI/ML module 310 also receives input from the Instrument Landing System 304 when it is in the proximity of the destination airport. The destination airport details are obtained from the flight plan typically stored in the FMS 302. The location of the aircraft is compared to the data in the Terrain Data Base/Online Terrain Data 312 to ascertain if the aircraft is approaching the destination airport. All of this data is input into the AI/ML module 310 is used to determine the pilot's intention to land. Once the system 300 has determined the pilot intends to land the aircraft, the AI/ML module 310 will analyze the available data and determine if the landing gear position is correct or not 314.

In determining the landing gear's position, the Enhanced Flight Audio Recording System (EFARS) 306 obtains and processes audio data from the aircraft. Note that every time the landing gear is deployed, there is characteristic noise associated with the sudden increase in drag resulting from the deployment. The EFARS 306 will record this audio data for further processing. The audio recorders/microphones which are part of the EFARS 306, are placed near the landing gears so that the audio noise can be monitored, recorded and relayed to an audio processing unit. The audio processing unit interprets the audio data to determine if the landing gear is extended or retracted.

The real time data from the audio recorders/microphones is recorded by the AI/ML module 310 during every landing and takeoff cycle. This data is stored to create a robust database of audio outputs versus the landing gear position (e.g., extended, retracted). Over successive landings, the AI/ML module 310 learns to correlate the landing gear position with the audio data received by the audio recorders/microphones.

Each time the aircraft extends its landing gear, severe drag is experienced by the aircraft. The increase in drag will also be accompanied by a small airspeed deceleration of the aircraft. The effects of the increased drag will be noted by the FMS 302 as tiny and rapid variations in pitch of the aircraft accompanied along with the deceleration in airspeed. In this instance, "pitch" is defined as the rotation of the aircraft around a side-to-side axis. It can be thought of as the "up and down" or "nodding" motion of the airplane.

As with the audio data captured from the EFARS 306, the real time data from FMS about the vibrations and deceleration is recorded by the AI/ML module 310 during every landing and takeoff cycle. This data is stored to create a robust database of vibrations/deceleration versus the landing gear position (e.g., extended, retracted). Over successive landings, the AI/ML module 310 learns to correlate the landing gear position with the vibrations/pitch/deceleration data received from the FMS 302. This analysis of historical data from the EFARS 306 and the FMS 302 enables the AI/ML module 310 to continually learn and make accurate determination of the position of the landing gear. It is a continual learning process to achieve high fidelity determination of the landing gear position.

In some embodiments, the system 300 may coordinate with an autopilot system and FMS 302 to enable automatic extension of the landing gear. This may be done after obtaining the consent of the pilot. In other embodiments, the system 300 may be used to analyze the data and determine if the landing gear of an aircraft needs to be retracted after takeoff. In essence, this embodiment works in the opposite in case the pilot has failed to retract the landing gear after completing a takeoff.

In should be apparent that the disclosed embodiments have several advantages. First, data from the inertial reference systems, Air Data Systems, EGPWS, Radar Altimeter and compare the same with the flight data and FMS data to understand the location and heading of the aircraft and determine if the aircraft is intending to land and prepare for the extension of the landing gear.

Next, in the event of failure of the landing gear position indicating system to correctly indicate the landing gears are retracted during a landing approach or the pilot choosing to deactivate the landing gear position indicating system at the time of landing. The AI/ML module 310 will receive data from the EFARS 306 which continually monitors the recorded audio. The data is processed by the AI/ML module 310 and the data is evaluated to determine the status of the landing gear. The status is compared with the data generated by the landing gear position indicating system to detect any failure or a system deactivation by the pilot.

Also, the flight performance data from the FMS 302 is evaluated to detect any a small deceleration, increase in vibrations and variations in pitch of the aircraft. The vibrations noted by the FMS and rapid variations in pitch of the aircraft, along with accompanied with the deceleration is due to the extended landing gear. This will be the condition for the AI/ML module 310 to conclude that the landing gear has been extended.

This flight data from the FMS 302 along with the audio data from EFARS 306 is recorded and saved to a database. This historical data is later retrieved and evaluated, interpreted as extended and results evaluated by the AI/ML module 310 against the present data to determine the landing gear status. This is a continually running and learning process to achieve a high fidelity determination of the landing gear position.

Figure 4:
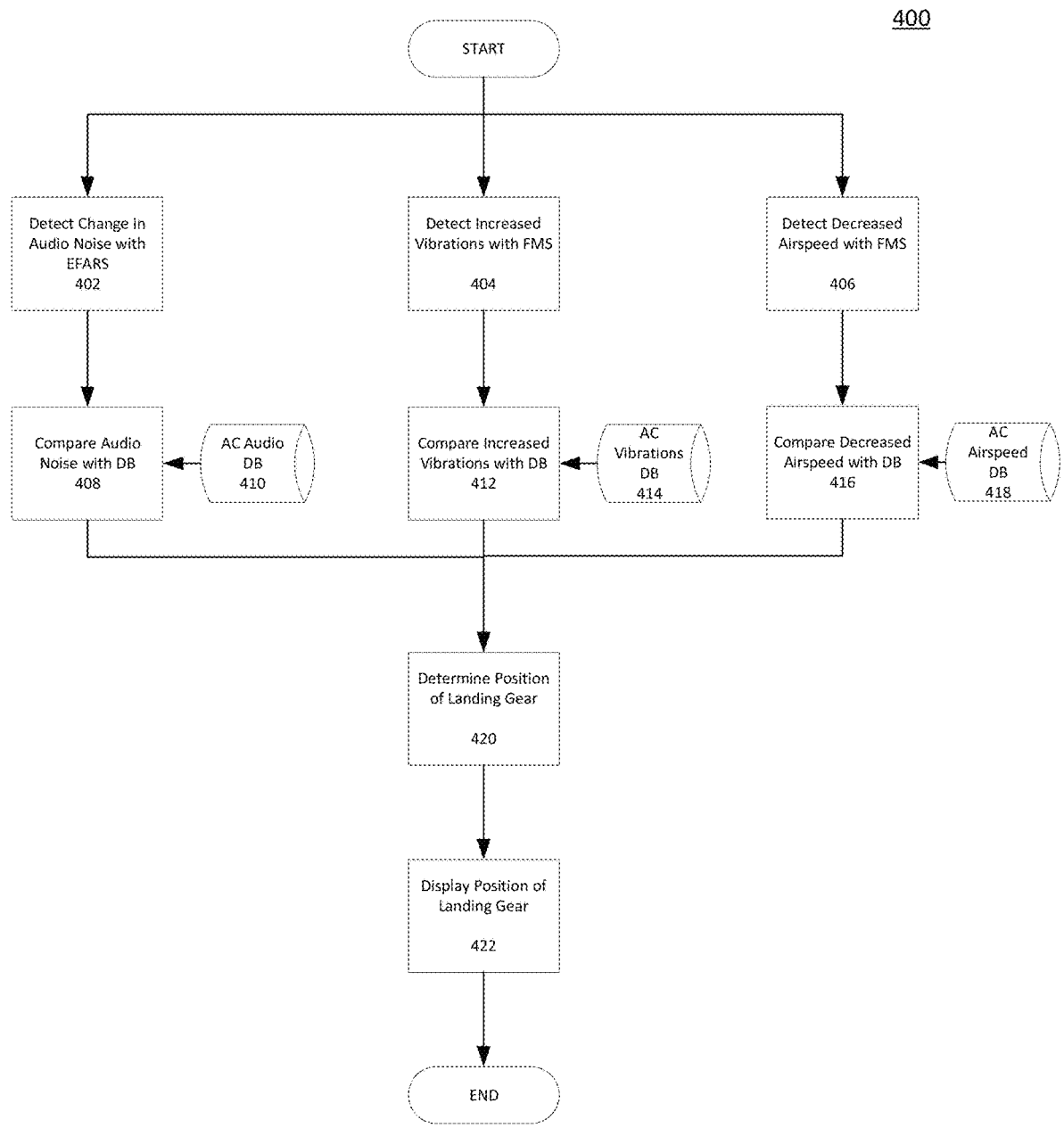
FIG. 4 shows a flowchart of a method for evaluating the position of landing gear on an aircraft in accordance with some embodiments.

Turning now to FIG. 4, a flowchart 400 is shown of a method for evaluating the position of landing gear on an aircraft in accordance with some embodiments. In this embodiment, a change is detected in audio noise of the aircraft from an enhanced flight audio recording system (EFARS) 402 and compared 408 with a database 410 of audio outputs of the aircraft with the landing gear extended. An increase in vibrations of the aircraft is detected with a flight management system (FMS) 404 and compared 412 to a database 414 of vibrations of the aircraft with the landing gear extended. A decrease in airspeed of the aircraft is detected with the FMS 406 and compared 416 with a database 418 of airspeed of the aircraft with the landing gear extended. The position of the landing gear is determined 420 based on results of comparisons of the change in audio noise, the increase in vibrations and the decrease in airspeed. The position of the landing gear is then displayed 422 to the pilot.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for evaluating the position of landing gear on an aircraft, comprising:
   detecting a change in audio noise of the aircraft from an enhanced flight audio recording system (EFARS) located onboard the aircraft;
   comparing the change in audio noise of the aircraft to a database of audio outputs of the audio pitch of the aircraft with the landing gear extended;
   detecting an increase in vibrations of the aircraft from a flight management system (FMS) located onboard the aircraft;
   comparing the increase in vibrations of the aircraft to a database of vibrations of the aircraft with the landing gear extended;
   detecting a decrease in airspeed of the aircraft from the FMS;
   comparing the decrease in airspeed of the aircraft to a database of airspeed of the aircraft with the landing gear extended;
   determining the position of the landing gear based on results of the comparisons of the change in audio noise, the increase in vibrations and the decrease in airspeed; and
   indicating the position of the landing gear to a pilot of the aircraft.

2. The method of claim 1, further comprising:
   determining the pilot's intention to land the aircraft using a learning module.

3. The method of claim 2, where the learning module determines the pilot's intention to land using the exact location of the aircraft.

4. The method of claim 3, where the exact location of the aircraft is determined using data from an inertial reference system.

5. The method of claim 3, where the exact location of the aircraft is determined using data from a global positioning system (GPS).

6. The method of claim 3, where the learning module determines the pilot's intention to land using a change in altitude of the aircraft.

7. The method of claim 6, where the change in altitude of the aircraft is determined by a radar altimeter.

8. The method of claim 6, where the change in altitude of the aircraft is determined by an enhanced ground proximity warning system (EGPWS).

9. The method of claim 6, where the learning module determines the pilot's intention to land using data about a destination airport.

10. The method of claim 9, where the learning module determines the pilot's intention to land by comparing the exact location of the aircraft, the change in altitude of the aircraft and data about the destination airport to determine if the aircraft is in a landing approach pattern for the destination airport.

11. A system for evaluating the position of landing gear on an aircraft, comprising:
    an enhanced flight audio recording system (EFARS) located onboard the aircraft, where the EFARS detects a change in audio noise of the aircraft;
    a flight management system (FMS) located onboard the aircraft, where the FMS detects an increase in vibrations of the aircraft;
    a learning module the is part of a processing system of a multifunction control and display unit (MCDU) located onboard the aircraft, where the learning module,
      compares the change in audio noise of the aircraft to a database of audio outputs of the audio pitch of the aircraft with the landing gear extended,
      detects an increase in vibrations of the aircraft from the FMS,
      compares the increase in vibrations of the aircraft to a database of vibrations of the aircraft with the landing gear extended,
      detects a decrease in airspeed of the aircraft from the FMS,
      compares the decrease in airspeed of the aircraft to a database of airspeed of the aircraft with the landing gear extended, and
      determines the position of the landing gear based on results of the comparisons of the change in audio noise, the increase in vibrations and the decrease in airspeed; and
    a display device located that indicates the position of the landing gear to a pilot of the aircraft.

12. The system of claim 11, further comprising:
    where the learning module determines the pilot's intention to land the aircraft.

13. The system of claim 12, where the learning module determines the pilot's intention to land using the exact location of the aircraft.

14. The system of claim 13, where the exact location of the aircraft is determined using data from an inertial reference system.

15. The system of claim 13, where the exact location of the aircraft is determined using data from a global positioning system (GPS).

16. The system of claim 13, where the learning module determines the pilot's intention to land using a change in altitude of the aircraft.

17. The system of claim 16, where the change in altitude of the aircraft is determined by a radar altimeter.

18. The system of claim 16, where the change in altitude of the aircraft is determined by an enhanced ground proximity warning system (EGPWS).

19. The system of claim 16, where the learning module determines the pilot's intention to land using data about a destination airport.

20. The system of claim 19, where the learning module determines the pilot's intention to land by comparing the exact location of the aircraft, the change in altitude of the aircraft and data about the destination airport to determine if the aircraft is in a landing approach pattern for the destination airport.

* * * * *